Patented Jan. 31, 1950 2,496,240

UNITED STATES PATENT OFFICE 2,496,240

DIAZOTYPES STABILIZED WITH SULFO AMINO BENZOIC ACIDS

William H. Von Glahn, Loudonville, and Lester N. Stanley, Delmar, N. Y., assignors to General Aniline & Film Corporation, New York, N. Y., a corporation of Delaware No Drawing. Application June 6, 1947, Serial No. 753,034

6 Claims. (Cl. 95—7)

This invention relates to a process for stabilization of diazotype materials and more particularly to the stabilization of so-called dry development or two-component diazotype light sensitive layers which contain both the diazo compound and the azo component.

Various processes are known for the preparation of light sensitive layers which depend upon the use of a diazo compound as the light sensitive medium and various materials have been employed for the carrier or base, the particular material selected depending upon the use to which the diazotype reproduction is to be put. The more common materials include paper, textiles, cellulosic films, such as cellulose acetate, cellulose nitrate, ethyl cellulose and regenerated cellulose films, glass, ceramic and metal surfaces. In practical commercial practice it is necessary to store the sensitized carrier for long periods of time prior to use and often such storage is maintained under adverse conditions of temperature and humidity. The diazo compounds are subject to decomposition, which is accelerated by heat, and when the diazo compound is incorporated into the light sensitive layer along with the azo coupling component in a two-component system, such as is contemplated by this invention, the light sensitive layer is also subject to premature coupling of the dyestuff components. Consequently, it is necessary to carefully select the diazo compounds and azo coupling components in order to obtain combinations which will be most stable under the adverse conditions of storage. As diazo compounds for dry development or two-component diazotype light sensitive layers, the most suitable have been found to be those which are derived from o- or p-aminonaphthols or aromatic p-diamines, particularly N-mono or di-substituted aromatic p-diamines capable of mono diazotization. These diazo compounds are best suited to resist decomposition under the conditions of storage. However, in order to obtain particularly desirable colors with these diazo compounds, it is often necessary to use azo coupling components which are very active or fast couplers and hence steps must be taken to retard the coupling function during storage and until the diazotype is to be used by exposure to actinic light under an original pattern and development by contacting with ammonia fumes.

Many methods have been suggested and used designed to make these light sensitive diazotype layers less sensitive to pre-coupling. The most common method comprises the addition of an hydroxycarboxylic acid, such as citric or tartaric acid, to the coating solution. However, these methods have failed under unusual conditions of storage, such as prolonged storage under hot and/or humid conditions. These methods are particularly unsuccessful when the layers contain the more active azo coupling components such as acetoacetanilide and 2,3-dihydroxynaphthalene used in obtaining deep colored images. It is, therefore, the object of this invention to produce coating solutions for the preparation of light sensitive diazotype layers which can be stored for long periods of time prior to use and will be stable against precoupling even under unfavorable conditions of storage.

It has been found that diazotype coating solutions and the light sensitive layers prepared therefrom can be stabilized against decomposition of the diazo compounds and premature coupling of the dyestuff components by adding to the coating solution a member of the group consisting of sulfo amino benzoic acids and their N-substituted derivatives. Examples of such compounds are 4-sulfo-anthranilic acid
5-sulfo-anthranilic acid
4-sulfo-N-acetyl anthranilic acid
4-sulfo-N-benzoyl anthranilic acid
5-sulfo-N-methyl anthranilic acid
5-sulfo-N-ethyl anthranilic acid
5-sulfo-N-ethyl,N-acetyl anthranilic acid
5-sulfo-N-ethyl,N-benzoyl anthranilic acid
5-sulfo-N-ethyl,N-benzene sulfonyl anthranilic acid
5-sulfo-N-methyl,N-benzoyl anthranilic acid
5-amino-2-sulfo-benzoic acid
3-amino-4-sulfo-benzoic acid.

Diazotype layers of the two-component type containing both the diazo compound and the azo coupling components which have been stabilized by the addition of these sulfo amino benzoic acids show greatly improved keeping qualities and are more stable against decomposition and premature coupling for much longer periods of storage and under more adverse conditions than is possible when using only hydroxycarboxylic acids as the stabilizing agents. While the amino sulfo benzoic acids containing free amino groups will produce a high degree of stability, their derivatives containing substituted amino groups and particularly the N-acyl derivatives are preferred due to their greater resistance to oxidation.

The following examples will serve to further illustrate the invention, it being understood that these examples are not intended as limitations. The parts are by weight unless otherwise stated.

*Example 1*

Transparentized diazotype paper is coated with the following ingredients per 100 cc. of aqueous solution:

3.0 grams N,N-diethylamino-p-benzene diazonium chloride-$ZnCl_2$ double salt
3.0 grams 2,3-dihydroxynaphthalene-6-sulfonic acid
0.2 grams 2,3-dihydroxynaphthalene 1.2 grams acetoacetanilide
5.0 grams zinc chloride
4.0 grams thiourea
6.0 grams citric acid
3.0 grams 4-sulfoanthranilic acid.

After storage at room temperature for two months, this paper was exposed to ultraviolet light under an original pattern and then developed by contacting the exposed paper with ammonia fumes. The image of the original pattern was developed in a black color on a clear white background. Compared with similar prints made from a coating solution corresponding to the above, except for the omission of the 4-sulfoanthranilic acid and addition of 3 grams of citric acid to the 6 grams already contained in the formula, the prints made in accordance with this example have a clearer background and consequently the contrast of the image is superior. The conditions and length of storage for both coatings were the same.

Upon substituting 3 grams of 4-sulfo-N-acetyl-anthronilic acid for the 3 grams of 4-sulfoanthranilic acid in the above formula, coatings are obtaining having the same properties as the coatings obtained using the 4-sulfoanthranilic acid. The stability of such coatings was superior to that of coatings made from a similar solution containing the citric acid but no 4-sulfo-N-acetyl-anthranilic acid. Also when substituting in this example 3 grams of 4-sulfo-N-benzoyl-anthranilic acid for the 3 grams of 4-sulfoanthranilic acid, coatings are obtained which have the same properties of high stability against precoupling as are obtained when using the 4-sulfoanthranilic acid.

*Example 2*

Diazotype paper stock is coated with the following ingredients per 100 cc. of aqueous solution:

1.4 grams N,N-diethylamino-p-benzene diazonium chloride-$ZnCl_2$ double salt
1 gram 2,3-dihydroxynaphthalene
4 grams thiourea
6 grams citric acid
3 grams 5-sulfo-N-methyl-anthranilic acid
5 grams zinc chloride After being stored for 6 hours under the severe conditions of an accelerated storage test at 40° C. and 50% relative humidity, this sensitized paper was exposed under an original pattern and developed to a blue image on a white background by contacting with ammonia fumes. There was practically no discoloration due to premature coupling in the background, whereas a similar print made with 9 grams of citric acid, but omitting the 3 grams of 5-sulfo-N-methyl-anthranilic acid of the above formula, after being subjected to the same accelerated storage test, exposed and developed, showed a light blue discoloration in the background.

Similar results are obtained when substituting for the 5-sulfo-N-methyl-anthranilic acid the following sulfo amino benzoic acids: 5-sulfo-N-ethyl-anthranilic acid, 5-sulfo-N-methyl-N-benzoyl-anthranilic acid, 5-sulfo-N-methyl-N-benzene-sulfonyl-anthranilic acid, 5-sulfo-N-ethyl-N-benzoyl-anthranilic acid, 5-amino-2-sulfo-benzoic acid and 3-amino-4-sulfo-benzoic acid.

In the above examples, the same properties of superior resistance against precoupling when using applicants' sulfo amino benzoic acid stabilizers are obtained when other types of supports are substituted for the paper and transparentized paper, such as cellulose acetate, ethyl cellulose and cellulose nitrate films and textile fabrics.

Having now fully described our invention and having set forth the best maner in which to practice it, what we claim as new is:

1. Photoprinting materials comprising light sensitive layers on a suitable base containing in the light sensitive layer a diazo compound suitable for forming a stable two-component diazotype layer, an azo dye coupling component and a member of the class consisting of sulfo amino benzoic acids and their N-substituted derivatives wherein the substituent group is a member of the class consisting of hydrocarbon and substituted hydrocarbon groups.

2. Photoprinting materials comprising light sensitive layers on a suitable base containing in the light sensitive layer a mono diazo compound derived from an aromatic p-diamine; an azo dye coupling component and a member of the class consisting of sulfo amino benzoic acids and their N-substituted derivatives wherein the substituent group is a member of the class consisting of hydrocarbon and substituted hydrocarbon groups.

3. Photoprinting materials comprising light sensitive layers on a suitable base containing in the light sensitive layer a diazo compound derived from an o-aminonaphthol compound; an azo dye coupling component and a member of the class consisting of sulfo amino benzoic acids and their N-substituted derivatives wherein the substituent group is a member of the class consisting of hydrocarbon and substituted hydrocarbon groups.

4. Photoprinting materials comprising light sensitive layers on a suitable base containing in the light sensitive layer a mono diazo compound derived from an aromatic p-diamine, an azo dye coupling component and 4-sulfo-anthranilic acid.

5. Photoprinting materials comprising light sensitive layers on a suitable base containing in the light sensitive layer a mono diazo compound derived from an aromatic p-diamine, an azo dye coupling component and 4-sulfo-N-acetyl-anthranilic acid.

6. Photoprinting materials comprising light sensitive layers on a suitable base containing in the light sensitive layer a mono diazo compound derived from an aromatic p-diamine, an azo dye coupling component and 5-sulfo-N-methyl-anthranilic acid.

WILLIAM H. VON GLAHN.
LESTER N. STANLEY.

REFERENCES CITED

The following references are of record in the file of this patent:

UNITED STATES PATENTS

| Number | Name | Date |
|---|---|---|
| 2,246,425 | Poser et al. | June 17, 1941 |

FOREIGN PATENTS

| Number | Country | Date |
|---|---|---|
| 293,347 | Great Britain | Publ. 1929 |